US012804746B2

(12) United States Patent
Nalla

(10) Patent No.: US 12,804,746 B2
(45) Date of Patent: Nov. 17, 2026

(54) SYSTEMS AND METHODS FOR DYNAMIC ADAPTATION TO LOGICAL CHANNEL ID RANGES

(71) Applicant: RAKUTEN SYMPHONY, INC., Tokyo (JP)

(72) Inventor: Pradeep Kumar Nalla, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 667 days.

(21) Appl. No.: 18/193,585

(22) Filed: Mar. 30, 2023

(65) Prior Publication Data

US 2024/0334513 A1 Oct. 3, 2024

(51) Int. Cl.
*H04W 4/00* (2018.01)
*H04L 5/00* (2006.01)
*H04W 76/15* (2018.01)

(52) U.S. Cl.
CPC ........... *H04W 76/15* (2018.02); *H04L 5/0094* (2013.01)

(58) Field of Classification Search
CPC ............................. H04W 76/15; H04L 5/0094
See application file for complete search history.

(56) References Cited

U.S. PATENT DOCUMENTS

2002/0126629 A1* 9/2002 Jiang ..................... H04W 12/03 370/328
2014/0254476 A1* 9/2014 Blankenship ......... H04W 28/22 370/328
2021/0377846 A1* 12/2021 Zhu ....................... H04L 5/0053
2022/0132491 A1* 4/2022 Zhang .................. H04W 72/51

* cited by examiner

*Primary Examiner* — Omoniyi Obayanju
(74) *Attorney, Agent, or Firm* — HAUPTMAN HAM, LLP

(57) ABSTRACT

A network system includes a non-transitory computer readable medium configured to store instructions thereon; and a processor. The processor is configured to execute the instructions for providing a first information element in a protocol, wherein the first information element is usable to configure parameters associated with convergence of packet data; providing a second information element within the first information element, wherein the second information element is usable for a first range of logical channels; and providing a third information element within the first information element, wherein the third information element is usable for a second range of logical channels outside of the first range of logical channels.

20 Claims, 6 Drawing Sheets

SYSTEMS AND METHODS FOR DYNAMIC ADAPTATION TO LOGICAL CHANNEL ID RANGES

TECHNICAL FIELD

This description relates to a network system and a method of using a network system.

BACKGROUND

The Third Generation Partnership Project (3GPP) includes protocols for mobile technology with contributions from numerous standards organizations. 3GPP has developed technologies including second-generation (2G) cellular network standards, third-generation (3G) cellular network standards, Long Term Evolution (LTE) and related fourth-generation (4G) cellular network standards, fifth-generation (5G) New Radio (NR) cellular network standards, and more.

SUMMARY

A system includes a non-transitory computer readable medium configured to store instructions thereon. The system further includes a processor connected to the non-transitory computer readable medium. The processor is configured to execute the instructions for providing a first information element in a protocol, wherein the first information element is usable to configure parameters associated with convergence of packet data. The processor is configured to execute the instructions for providing a second information element within the first information element, wherein the second information element is usable for a first range of logical channels. The processor is configured to execute the instructions for providing a third information element within the first information element, wherein the third information element is usable for a second range of logical channels outside of the first range of logical channels.

A method includes providing a first information element in a protocol, wherein the first information element is usable to configure parameters associated with convergence of packet data. The method further includes providing a second information element within the first information element, wherein the second information element is usable for a first range of logical channels. The method further includes providing a third information element within the first information element, wherein the third information element is usable for a second range of logical channels outside of the first range of logical channels.

A non-transitory computer readable medium configured to store instructions thereon. The instructions are configured to cause a processor to perform operations comprising providing a first information element in a protocol, wherein the first information element is usable to configure parameters associated with convergence of packet data. The instructions are configured to cause a processor to perform operations comprising providing a second information element within the first information element, wherein the second information element is usable for a first range of logical channels. The instructions are configured to cause a processor to perform operations comprising providing a third information element within the first information element, wherein the third information element is usable for a second range of logical channels outside of the first range of logical channels.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
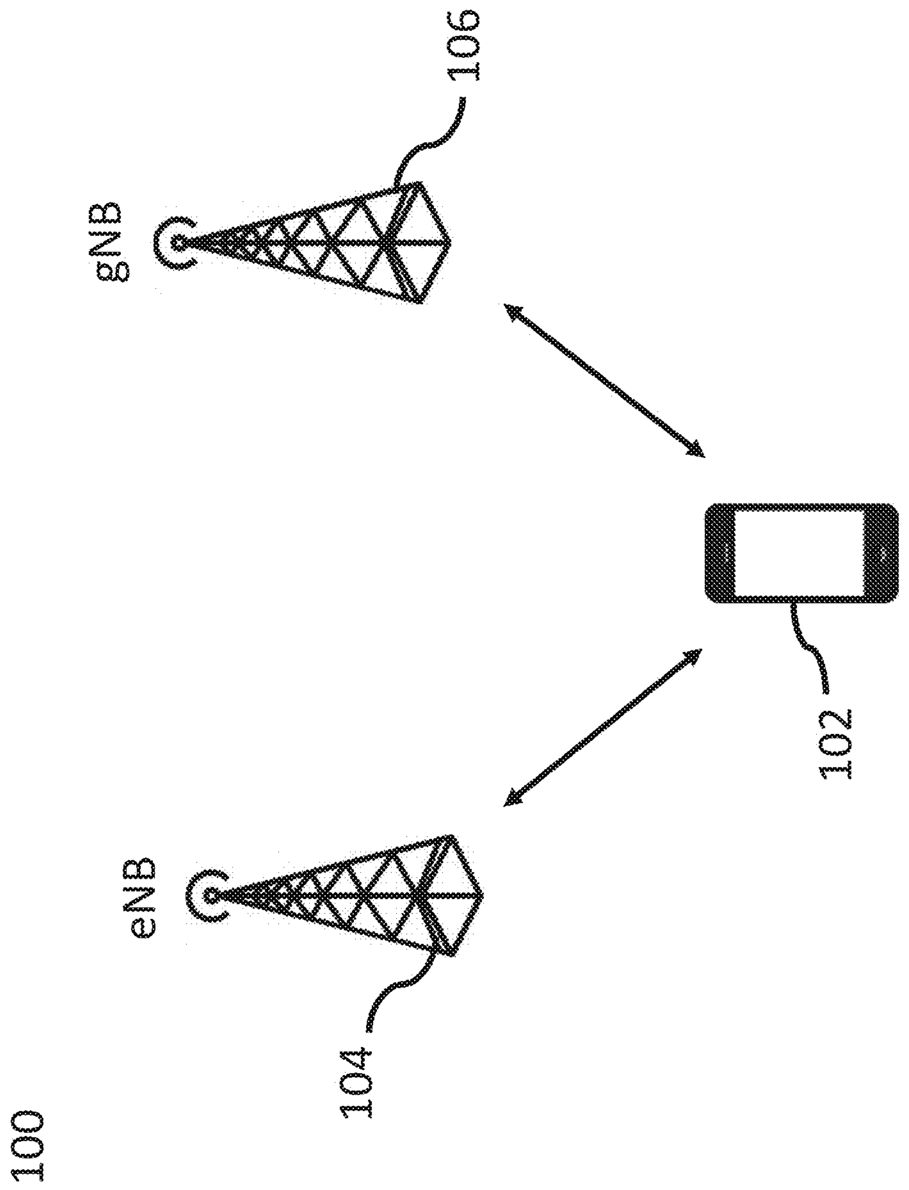
FIG. 1 is a schematic diagram of a network system, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

There are several instances wherein technology evolution creates inconsistencies or incompatibilities between previous capabilities and newly introduced capabilities. In some instances, technologies become stale, outdated or become unable to provide support for newly introduced capabilities. In some instances, technologies are built with specific parameters or limitations that are unable to accommodate growth or unanticipated introduction of technology features.

In some instances, telecommunications, wireless, or cellular technology becomes outdated due to the rapid evolution or use of technology in the wireless or cellular technology area. In some instances, a shift in technological capabilities or features is observable between fourth generation (4G)/Long-Term Evolution (LTE™) and fifth generation (5G) broadband cellular network technology. LTE™ sought to increase the capacity and speed of wireless data networks using new DSP (digital signal processing) techniques and modulations that previously were developed, and to redesign and simplify the network architecture to an internet protocol (IP) based system with reduced transfer latency, compared with the third generation (3G) broadband cellular network technology. Yet not only are 5G networks even faster than predecessor 4G networks, 5G possesses higher bandwidth and is able to connect a larger number of different devices, improving quality of internet services. As a result, rapid adaptability and new solutions needed to accommodate rapidly changing broadband cellular network technology.

In some more specific instances, logical channel ID (LCID) ranges that are accommodated or used have changed between LTE and 5G technologies. In some instances, in LTE specifications LCIDs are limited. This causes a technological mismatch or deficiency in accommodating new technology.

In order to help reduce or solve these problems associated with technological evolution or shifts described, the current description includes systems and methods that accommodate dynamic switching and/or accommodating various LCID ranges. The current description includes systems and methods that allow for extended LCID ranges. The current description includes systems and methods to dynamically determine LCID capabilities and/or ranges, and to dynamically adapt to LCID range options. As a result, the current description includes systems and methods that are able to address deficiencies associated with technological mismatches or outdated architecture.

FIG. 1 is a schematic diagram of a network system 100, in accordance with some embodiments. The network system 100 includes user equipment (UE) 102. In some embodiments, UE 102 is a cellular device configured to communicate with a cellular network. In some embodiments, UE 102 is a cellular phone, mobile device, tablet, personal computer (PC), or mobile hotspot device. The network system 100 further includes Long Term Evolution (LTE) base station Evolved Node B (eNB) 104. The network system 100 further includes fifth generation (5G) New Radio (NR) base station gNodeB (gNB) 106.

The UE 102 is configured to communicate with eNB 104. In some embodiments, UE 102 is configured to receive downlink data from eNB 104. In some embodiments, UE 102 is configured to deliver or send uplink data to eNB 104. In some embodiments, eNB 104 is configured to deliver configuration data to UE 102. In some embodiments, eNB 104 is configured to receive configuration data from UE 102.

The UE 102 is configured to communicate with gNB 106. In some embodiments, UE 102 is configured to receive downlink data from gNB 106. In some embodiments, UE 102 is configured to deliver or send uplink data to gNB 106. In some embodiments, gNB 106 is configured to deliver configuration data to UE 102. In some embodiments, gNB 106 is configured to receive configuration data from UE 102.

Figure 2:
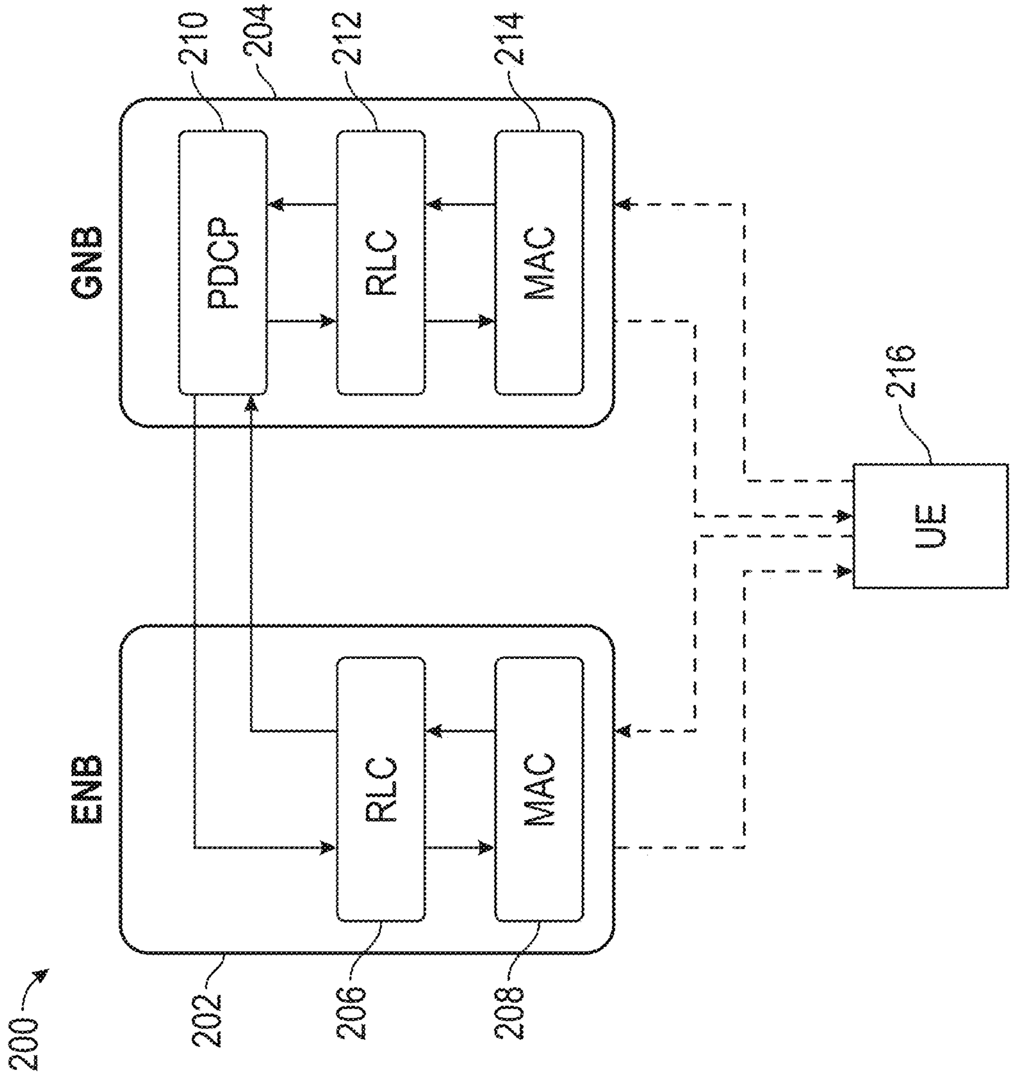
FIG. 2 is a schematic diagram of a portion of a network system, in accordance with some embodiments.

FIG. 2 is a schematic diagram of a portion of a network system 200, in accordance with some embodiments.

The network system 200 includes UE 216 in communication with eNB 202 and in communication with a gNB 204. In some embodiments, the network system 200 is usable in the network system 100 (FIG. 1). In some embodiments, the network system 200 is usable in a network system other than the network system 100 (FIG. 1). In some embodiments, the UE 216 communicates with eNB 202 and gNB 204 wirelessly. In comparison with the network system 100 (FIG. 1), eNB 202 and gNB 204 the network system 200 include additional details for describing functionality and components of the network system 200.

The eNB 202 is configured to communicate with gNB 204 and gNB 204 is configured to communicate with eNB 202. In some embodiments, eNB 202 and gNB 204 work in coordination or concert to improve throughput for UE 216.

The network system 200 includes UE 216 configured to communicate with, and attached and admitted to, eNB 202. In some embodiments, UE 216 is configured to receive downlink data from eNB 202. In some embodiments, UE 216 is configured to deliver or send uplink data to eNB 202. In some embodiments, eNB 202 is configured to deliver configuration data to UE 202. In some embodiments, eNB 202 is configured to receive configuration data from UE 202. In some embodiments, eNB 202 is configured to provide or send configuration data including path configuration data such as a moreThanOneRLC information element (IE) and threshold data such as a ul-DataSplitThreshold IE. In some embodiments, a moreThanOneRLC IE includes a primary path. In some embodiments, a moreThanOneRLC IE or primary path includes an identifier such as a Logical Channel Identity (LCID) and an identifier such as a cell group identifier. In some embodiments, a moreThanOneRLC IE includes a threshold defining a cutoff to split uplink data between a primary path and a subordinate, or secondary, path such as a ul-DataSplit Threshold IE. In some embodiments, a moreThanOneRLC IE or primary path includes an identifier such as a Logical Channel Identity (LCID) within a first range. In some embodiments, a moreThanOneRLC IE or primary path includes an identifier such as a Logical Channel Identity (LCID) within a second range that is outside of a first range.

The eNB 202 includes Radio Link Control (RLC) 206 layer and Medium Access Control (MAC) 208 layer. RLC 206 is configured to communicate with MAC 208. In some embodiments, any of eNB 202, RLC 206, and MAC 208 are associated with a first LCID. In some embodiments, the first LCID is within a first range. In some embodiments, the first LCID is within a first range corresponding to LTE LCIDs. In some embodiments, the first range comprises one or more integer values less than 33.

The network system 200 includes UE 216 configured to communicate with, and attached and admitted to, gNB 204. In some embodiments, UE 216 is configured to receive downlink data from gNB 204. In some embodiments, UE 216 is configured to deliver or send uplink data to gNB 204. In some embodiments, gNB 204 is configured to deliver configuration data to UE 202. In some embodiments, gNB 204 is configured to receive configuration data from UE 202. In some embodiments, gNB 204 is configured to provide or send configuration data including path configuration data such as a moreThanOneRLC information element (IE) and threshold data such as a ul-DataSplitThreshold IE. In some embodiments, a moreThanOneRLC IE includes a primary path. In some embodiments, a moreThanOneRLC IE or primary path includes an identifier such as a Logical Channel Identity (LCID) and an identifier such as a cell group identifier. In some embodiments, a moreThanOneRLC IE includes a threshold defining a cutoff to split uplink data between a primary path and a subordinate, or secondary, path such as a ul-DataSplitThreshold IE. In some embodiments, a moreThanOneRLC IE or primary path includes an identifier such as a Logical Channel Identity (LCID) within a first range. In some embodiments, a moreThanOneRLC IE or primary path includes an identifier such as a Logical Channel Identity (LCID) within a second range that is outside of a first range.

The gNB 204 includes Radio Link Control (RLC) 212 layer and Medium Access Control (MAC) 214 layer. RLC 212 is configured to communicate with MAC 214. In some embodiments, any of gNB 204, RLC 212, and MAC 214 are associated with a second LCID. In some embodiments, the first LCID is within a second range. In some embodiments, the second LCID is within a second range corresponding to 5G LCIDs. In some embodiments, the second range comprises one or more integer values greater than 32.

Figure 3:
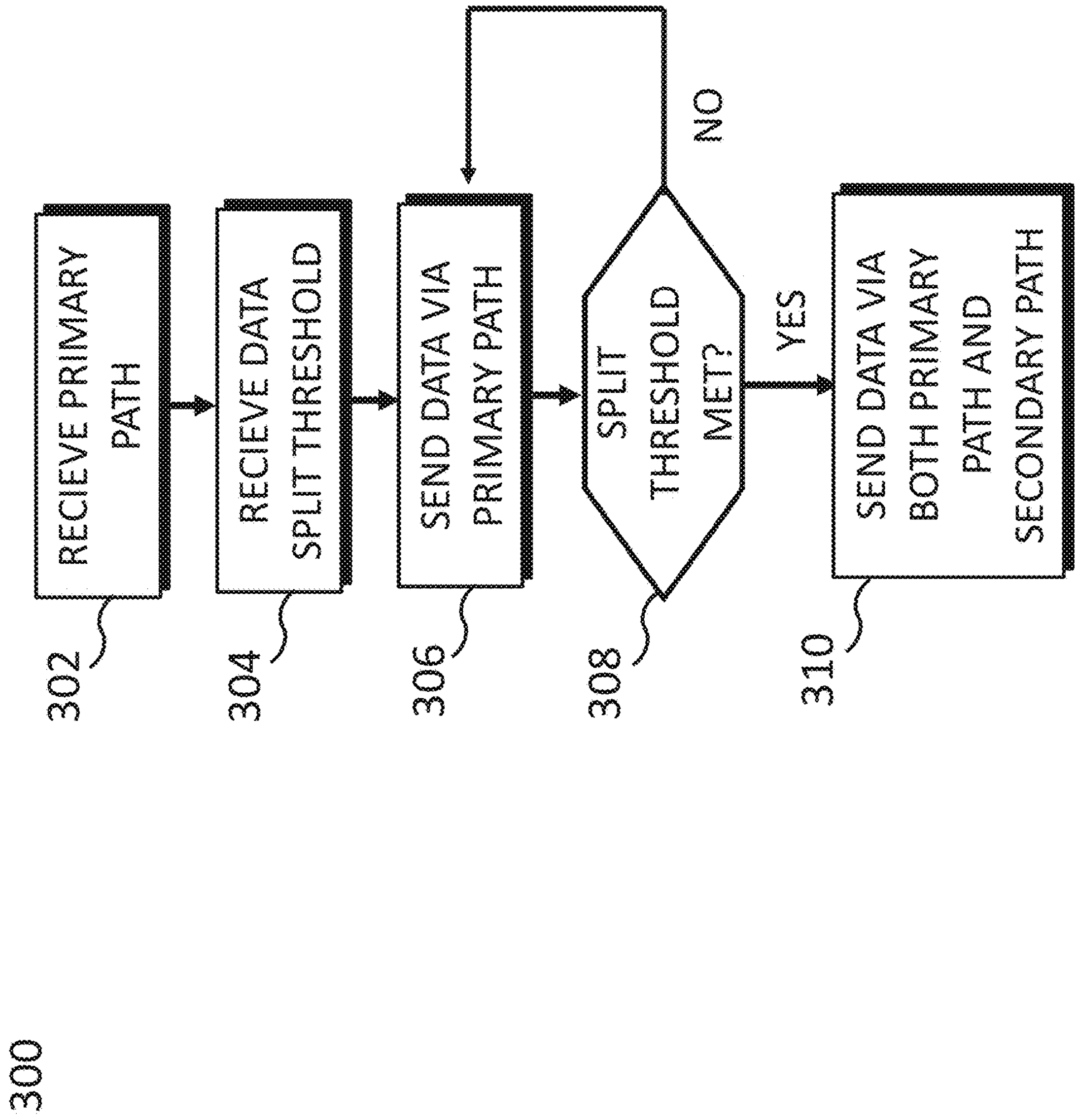
FIG. 3 is a flowchart of a method of using a network system, in accordance with some embodiments.

FIG. 3 is a flowchart of a method 300 of using a network system, in accordance with some embodiments. The method 300 is usable by a network system in order to help ensure that any LCID case is handled. By allowing for any LCID, the method 300 helps to ensure that new technology deployment are handled for which LCIDs or LCID ranges are introduced. In some embodiments, the method 300 is able to be executed by the network system 100 (FIG. 1) or the network system 200 (FIG. 2). In some embodiments, the method 300 is able to be executed by a network system other than the network system 100 (FIG. 1) or the network system 200 (FIG. 2).

In operation 302, a primary path is received by a UE, e.g. UE 102 (FIG. 1) or UE 216 (FIG. 2). In some embodiments, the primary path is received from an eNB, e.g. eNB 104 (FIG. 1) or eNB 202 (FIG. 2). In some embodiments, the primary path is received from a gNB, e.g. gNB 106 (FIG. 1) or gNB 204 (FIG. 2). In some embodiments, the primary path defines or describes a first LCID. In some embodiments, the first LCID is within a first range. In some embodiments, the first LCID is within a first range corresponding to LTE LCIDs. In some embodiments, the first range comprises one or more integer values less than 33.

In operation 304, a data split threshold is received by a UE, e.g. UE 102 (FIG. 1) or UE 216 (FIG. 2). In some embodiments, the data split threshold is received from an eNB, e.g. eNB 104 (FIG. 1) or eNB 202 (FIG. 2). In some embodiments, the data split threshold is received from a gNB, e.g. gNB 106 (FIG. 1) or gNB 204 (FIG. 2). In some embodiments, the primary path defines or describes a second LCID. In some embodiments, the first LCID is within a second range. In some embodiments, the second LCID is within a second range corresponding to 5G LCIDs. In some embodiments, the second range comprises one or more integer values greater than 32.

In operation 306, data is sent by a UE, e.g. UE 102 (FIG. 1) or UE 216 (FIG. 2) via the primary path. In some embodiments, the data includes uplink data.

In operation 308, a determination is made as to whether the data split threshold has been met. In some embodiments, the determination is made more than once. In some embodiments, the determination is made repeatedly. In some embodiments, the determination is made continuously. In some embodiments, the determination is made intermittently. In some embodiments, the determination is made at pre-defined intervals. If it is determined that a split threshold has not been met, operation 306 continues or is repeated. If it is determined that a split threshold has been met, operation 310 is carried out.

In operation 310, data is sent by a UE, e.g. UE 102 (FIG. 1) or UE 216 (FIG. 2) via the secondary, or subordinate, path, in addition to the primary path. In some embodiments, data is sent via only the secondary path. In some embodiments, the data includes uplink data.

One of ordinary skill in the art would understand that additional operations are possible within process 300 in some embodiments. For example, in some embodiments, the process 300 further includes additional threshold determination operations. In some embodiments, an order of operations of the process 300 is changed. For example, in some embodiments the operation 304 is performed prior to the operation 302. In some embodiments, at least one operation of the process 300 is omitted. For example, in some embodiments, the operation 310 is omitted.

Utilizing the process 300 helps to ensure that incoming LCIDs are accommodated. As a result, incoming technologies can cooperate with prior technologies more efficiently or more seamlessly.

Figure 4:
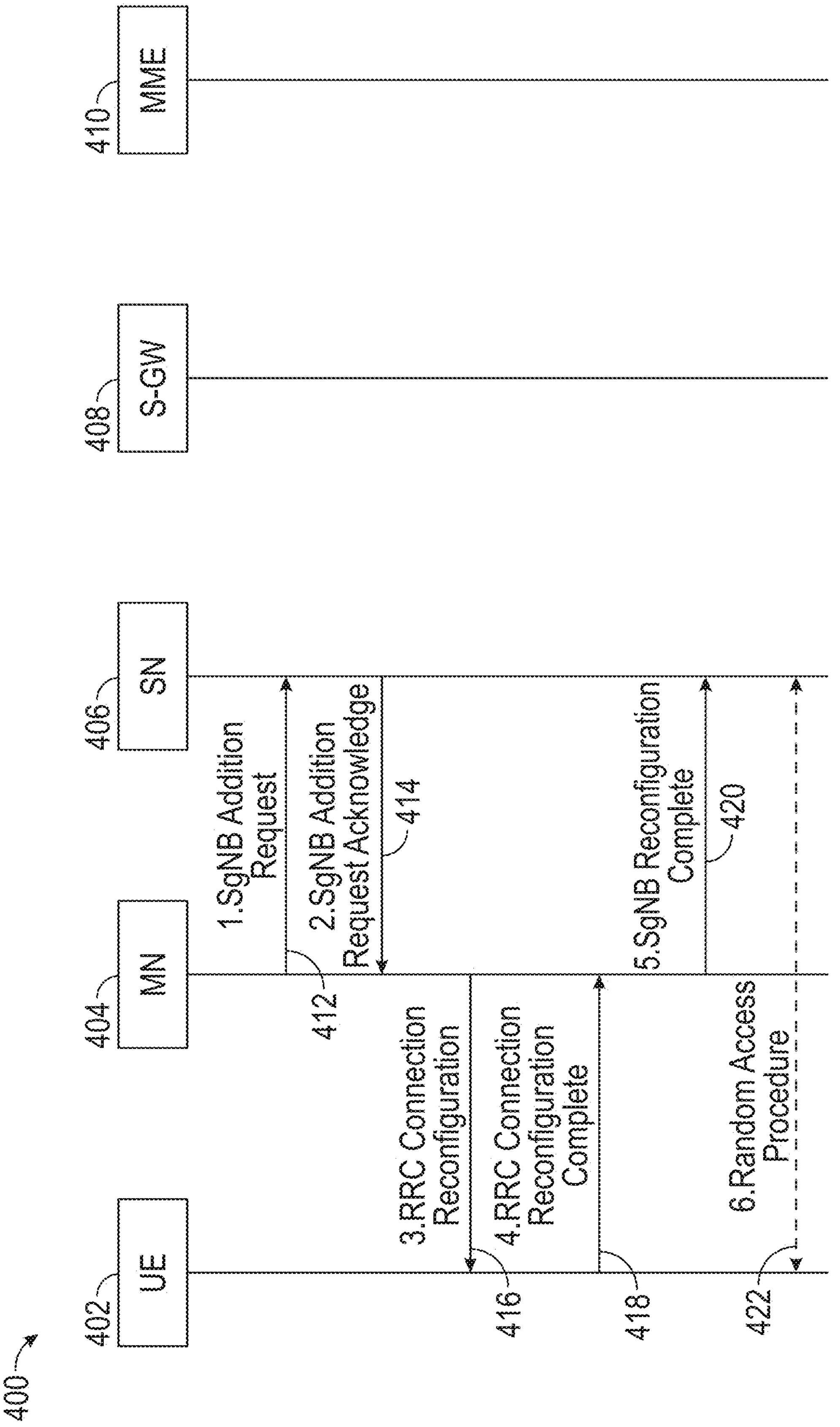
FIG. 4 is a sequence diagram of a method of using a network system, in accordance with some embodiments.

FIG. 4 is a sequence diagram of a method 400 of using a network system, in accordance with some embodiments. The method 400 is usable by a network system in order to help ensure that any LCID case is handled during a signaling procedure to establish UE context at a SgNB. By allowing for any LCID, the method 400 helps to ensure that new technology deployment are handled for which LCIDs or LCID ranges are introduced. In some embodiments, the method 400 is able to be executed by the network system 100 (FIG. 1) or the network system 200 (FIG. 2). In some embodiments, the method 400 is able to be executed by a network system other than the network system 100 (FIG. 1) or the network system 200 (FIG. 2).

The UE 402 is in communication with a master node (MN) 404, e.g. eNB 104 (FIG. 1) or eNB 202 (FIG. 2) and in communication with a secondary node (SN) 406, e.g. gNB 106 (FIG. 1) or gNB 204 (FIG. 2). The UE 402 is further in communication with serving gateway (S-GW) 408 and mobile management entity (MME) 410.

In operation 412, a secondary gNB (SgNB) addition request is sent or delivered from MN 404 to SN 406. In some embodiments, the SgNB addition request includes a message or payload that is delivered from MN 404 to SN 406 including one or more identifiers such as an E-RAB (E-UTRAN Radio Access Bearer) ID, a DRB (Data Radio Bearer) ID, or both. In some embodiments, an SgNB addition request includes sending bearer-related radio configuration information for a bearer from an eNB to a gNB to allow for dual connectivity to LTE and 5G technologies. In some embodiments, an SgNB addition request includes sending bearer-related radio configuration information for a bearer from an eNB to a gNB including a type of bearer. In some embodiments, an SgNB addition request includes sending bearer-related radio configuration information for a bearer from an eNB to a gNB including any information of that bearer.

Figure 5:
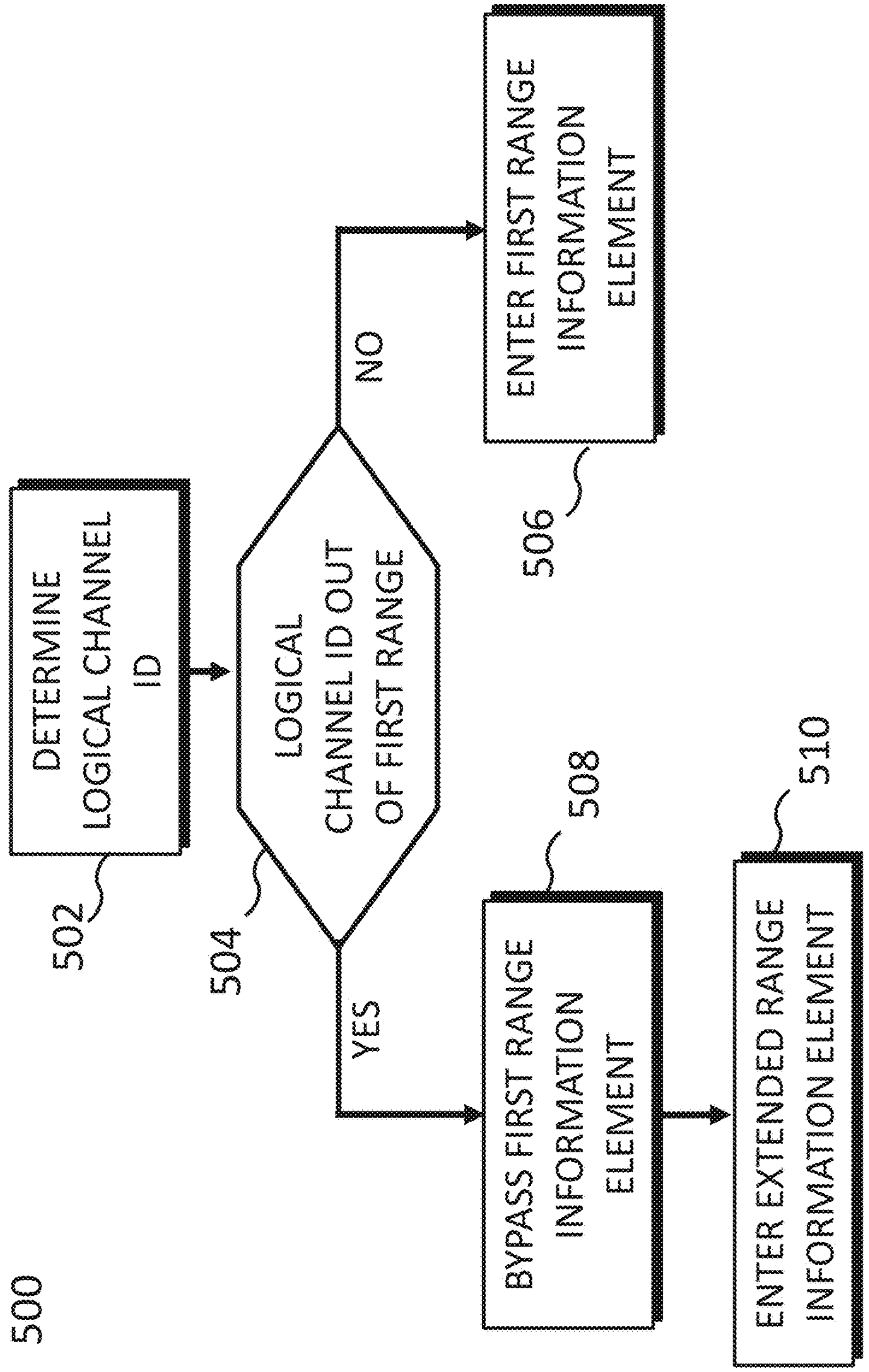
FIG. 5 is a flowchart of a method of using a network system, in accordance with some embodiments.

In operation 414, the SgNB addition request is accepted and acknowledged, and an acknowledgement message or payload is sent or delivered from SN 406 to MN 404. In some embodiments, a bearer is admitted by a gNB based on bearer-related radio configuration information sent from an eNB to a gNB. In some embodiments, a bearer admission by a gNB based on bearer-related radio configuration information sent from an eNB to a gNB fails. In some embodiments, an acknowledgement message or payload sent or delivered from SN 406 to MN 404 includes a success or failure message corresponding to whether a bearer is admitted based on bearer-related radio configuration information. In some embodiments, an acknowledgement message or payload sent or delivered from SN 406 to MN 404 includes a bearer identity or identifier. In some embodiments, an acknowledgement message or payload sent or delivered from SN 406 to MN 404 includes some or all of the bearer-related radio configuration information received by SN 406 in operation 412. In some embodiments, an acknowledgement message or payload sent or delivered from SN 406 to MN 404 includes a radio configuration to be sent to a UE. In some embodiments, an acknowledgement message or payload sent or delivered from SN 406 to MN 404 includes a moreThanOneRLC IE according to embodiments described herein. In some embodiments, an acknowledgement message or payload sent or delivered from SN 406 to MN 404 includes a moreThanOneRLC IE comprising a primary path for uplink data that is determined by SN 406. In some embodiments, an acknowledgement message or payload sent or delivered from SN 406 to MN 404 includes an LCID that is determined by SN 406. In some embodiments, an acknowledgement message or payload sent or delivered from SN 406 to MN 404 includes a data split threshold such as a ul-DataSplitThreshold that is determined by SN 406. In some embodiments, the primary path or LCID corresponds to SN 406. In some embodiments, the primary path or LCID corresponds to MN 404. In some embodiments, the moreThanOneRLC IE or primary path includes an identifier such as a Logical Channel Identity (LCID) within a first range. In some embodiments, the moreThanOneRLC IE or primary path includes an identifier such as a Logical Channel Identity (LCID) within a second range that is outside of a first range. In some embodiments, an acknowledgement message or payload sent or delivered from SN 406 to MN 404 does not include a more ThanOneRLC IE, an empty moreThanOneRLC IE, or a moreThanOneRLC IE that does not specify a primary path or an LCID. In some embodiments, the moreThanOneRLC IE is created, defined, filled, or handled according to embodiments of methods described herein, e.g. method 500 (FIG. 5).

In operation 416, a Radio Resource Control (RRC) connection reconfiguration message or payload is sent or delivered from MN 404 to UE 402. In some embodiments, the RRC connection reconfiguration message or payload includes some or all of the data in the acknowledgement message or payload or operation 414. In some embodiments, a radio bearer configuration IE is filled, created, or determined by MN 404. In some embodiments, this radio bearer configuration includes a moreThanOneRLC IE according to embodiments described herein. In some embodiments, a radio bearer configuration IE is filled, created, or determined by MN 404 based on failing to receive a complete more ThanOneRLC IE from SN 406. In some embodiments, this more ThanOneRLC IE comprises a primary path for uplink data that is determined by MN 404. In some embodiments, this moreThanOneRLC IE includes an LCID that is determined by MN 404. In some embodiments, this moreThanOneRLC IE includes a data split threshold such as a ul-DataSplitThreshold that is determined by MN 404. In some embodiments, the primary path or LCID corresponds to SN 406. In some embodiments, the primary path or LCID corresponds to MN 404. In some embodiments, the more ThanOneRLC IE or primary path includes an identifier such as a Logical Channel Identity (LCID) within a first range. In some embodiments, the moreThanOneRLC IE or primary path includes an identifier such as a Logical Channel Identity (LCID) within a second range that is outside of a first range. In some embodiments, the RRC connection reconfiguration message or payload does not include a moreThanOneRLC IE, an empty moreThanOneRLC IE, or a moreThanOneRLC IE that does not specify a primary path or an LCID. In some embodiments, the moreThanOneRLC IE is created, defined, filled, or handled according to embodiments of methods described herein, e.g. method 500 (FIG. 5).

In operation 418, an RRC reconfiguration complete message or payload is sent or delivered from UE 402 to MN 404. In some embodiments, the RRC connection reconfiguration complete message or payload includes a success message. In some embodiments, the RRC connection reconfiguration complete message or payload includes a failure message.

In operation 420, an SgNB reconfiguration complete message or payload is sent or delivered from MN 404 to SN 406. In some embodiments, the SgNB reconfiguration complete message or payload includes a success message. In some embodiments, the SgNB reconfiguration complete message or payload includes a failure message.

In operation 422, a Random Access Procedure is carried out. In some embodiments, the Random Access Procedure is an initial access procedure.

FIG. 5 is a flowchart of a method 500 of using a network system, in accordance with some embodiments. The method 500 is usable by a network system in order to help ensure that any LCID case is handled. By allowing for any LCID, the method 500 helps to ensure that new technology deployment are handled for which LCIDs or LCID ranges are introduced. In some embodiments, the method 500 is able to be executed by the network system 100 (FIG. 1) or the network system 200 (FIG. 2). In some embodiments, the method 500 is able to be executed by a network system other than the network system 100 (FIG. 1) or the network system 200 (FIG. 2).

In operation 502, an LCID is identified, determined, calculated, created, or selected. In some embodiments, the LCID is determined by an eNB, at an eNB, or using an eNB, e.g. eNB 104 (FIG. 1) or eNB 202 (FIG. 2). In some embodiments, the LCID is determined by a gNB, at a gNB, or using a gNB, e.g. gNB 106 (FIG. 1) or gNB 204 (FIG. 2).

In some embodiments, the first LCID is within a first range. In some embodiments, the first LCID is within a first range corresponding to LTE LCIDs. In some embodiments, the first LCID is within a first range corresponding to 5G LCIDs. In some embodiments, the first range comprises one or more integer values less than 33. In some embodiments, the first range comprises one or more integer values less than or equal to 33. In some embodiments, the first range comprises one or more integer values greater than 33. In some embodiments, the first range comprises one or more integer values greater than or equal to 33. In some embodiments, the first range comprises one or more integer values 3-10. In some embodiments, the first range comprises one or more integer values 32-38. In some embodiments, the first range comprises one or more integer values 3-10 and 32-28. In some embodiments, the first range comprises one or more integer values 1-32.

In some embodiments, the first LCID is within a second range. In some embodiments, the first LCID is within a second range corresponding to LTE LCIDs. In some embodiments, the first LCID is within a second range corresponding to 5G LCIDs. In some embodiments, the second range comprises one or more integer values less than 33. In some embodiments, the second range comprises one or more integer values less than or equal to 33. In some embodiments, the second range comprises one or more integer values greater than 33. In some embodiments, the second range comprises one or more integer values greater than or equal to 33. In some embodiments, the second range comprises one or more integer values 3-10. In some embodiments, the second range comprises one or more integer values 32-38. In some embodiments, the second range comprises one or more integer values 3-10 and 32-28. In some embodiments, the second range comprises one or more integer values 1-32.

In operation 504, a determination is made whether an LCID within the first range. In some embodiments, the determination is made by an eNB, at an eNB, or using an eNB, e.g. eNB 104 (FIG. 1) or eNB 202 (FIG. 2). In some embodiments, the determination is made by a gNB, at a gNB, or using a gNB, e.g. gNB 106 (FIG. 1) or gNB 204 (FIG. 2). In some embodiments, if an LCID is determined to be within the first range, operation 506 is executed. In some embodiments, if an LCID is determined to be outside of the first range, beyond the first range, or within a second range, operation 508 is executed.

In operation 506, if the LCID is within the first range, an information element for handling LCIDs within the first range is entered or executed. In some embodiments, the executing the information element is made by an eNB, at an eNB, or using an eNB, e.g. eNB 104 (FIG. 1) or eNB 202 (FIG. 2). In some embodiments, the executing the information element is made by a gNB, at a gNB, or using a gNB, e.g. gNB 106 (FIG. 1) or gNB 204 (FIG. 2).

In operation 508, if the LCID is outside of the first range, the information element for handling LCIDs within of the first range is bypassed. In some embodiments, the bypassing made by an eNB, at an eNB, or using an eNB, e.g. eNB 104 (FIG. 1) or eNB 202 (FIG. 2). In some embodiments, the executing the information element is made by a gNB, at a gNB, or using a gNB, e.g. gNB 106 (FIG. 1) or gNB 204 (FIG. 2).

In operation 510, an information element for handling LCIDs in an extended range outside of the first range is entered or executed. In some embodiments, the executing the information element is made by an eNB, at an eNB, or using an eNB, e.g. eNB 104 (FIG. 1) or eNB 202 (FIG. 2). In some embodiments, the executing the information element is made by a gNB, at a gNB, or using a gNB, e.g. gNB 106 (FIG. 1) or gNB 204 (FIG. 2).

One of ordinary skill in the art would understand that additional operations are possible within process 500 in some embodiments. For example, in some embodiments, the process 500 further includes additional bypassing operations or additional information elements for handling different LCID range cases. In some embodiments, an order of operations of the process 500 is changed. In some embodiments, at least one operation of the process 500 is omitted. For example, in some embodiments, the operation 508 is omitted.

Utilizing the process 500 helps to ensure that incoming LCIDs are accommodated. As a result, incoming technologies can cooperate with prior technologies more efficiently or more seamlessly.

Figure 6:
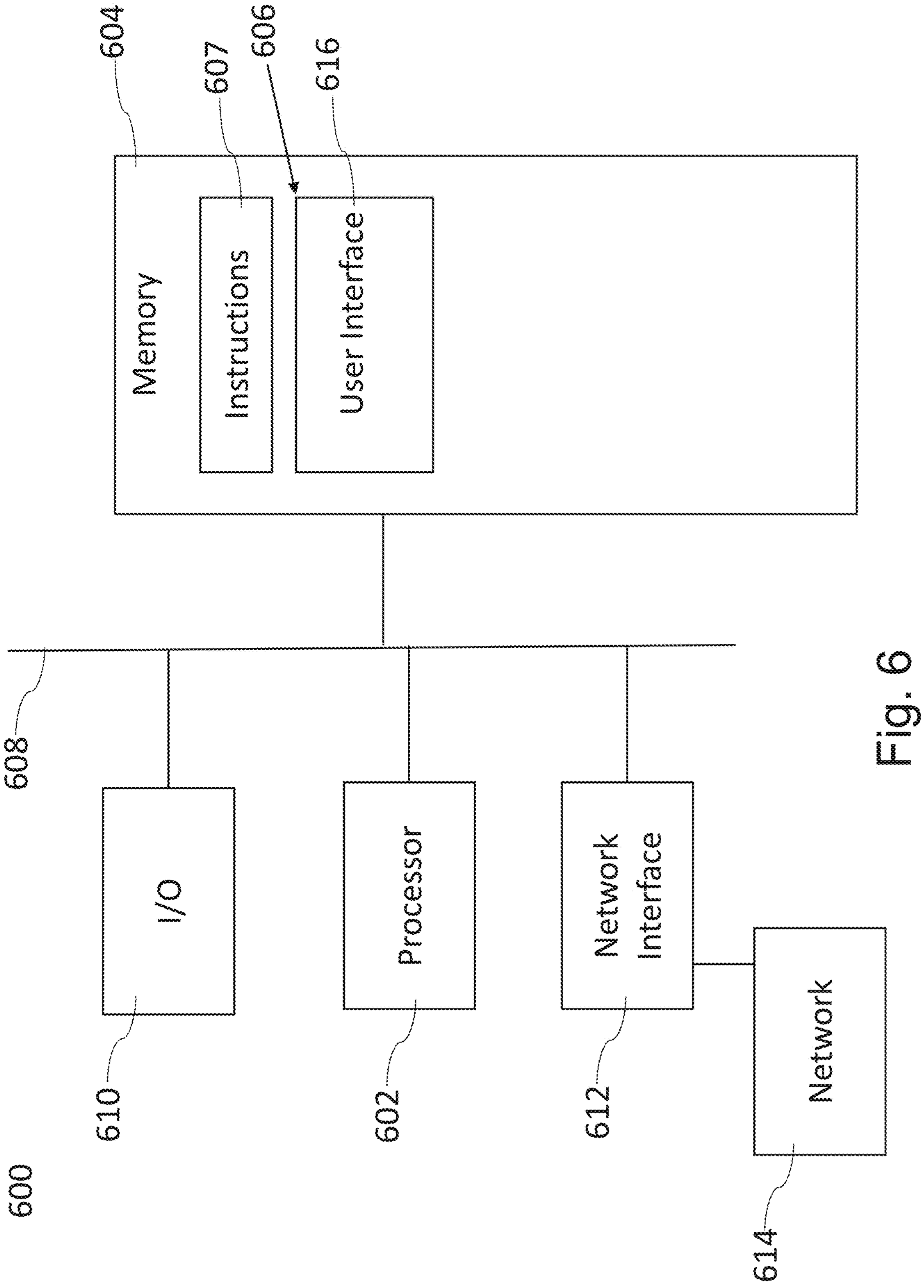
FIG. 6 is a block diagram of computer architecture in accordance with some embodiments.

FIG. 6 is a block diagram of computer architecture 600 in accordance with some embodiments.

Computer architecture 600 includes a hardware processor 602 and a non-transitory, computer readable storage medium 604 encoded with, i.e., storing, the computer program code 606, i.e., a set of executable instructions. Computer readable storage medium 604 is also encoded with instructions 607 for interfacing with external devices. The processor 602 is electrically coupled to the computer readable storage medium 604 via a bus 608. The processor 602 is also electrically coupled to an I/O interface 610 by bus 608. A network interface 612 is also electrically connected to the processor 602 via bus 608. Network interface 612 is connected to a network 614, so that processor 602 and computer readable storage medium 604 are capable of connecting to external elements via network 614. The processor 602 is configured to execute the computer program code 606 encoded in the computer readable storage medium 604 in order to cause computer architecture 600 to be usable for performing a portion or all of the operations as described herein.

In some embodiments, the processor 602 is a central processing unit (CPU), a multi-processor, a distributed processing system, an application specific integrated circuit (ASIC), or a suitable processing unit.

In some embodiments, the computer readable storage medium 604 is an electronic, magnetic, optical, electromagnetic, infrared, or a semiconductor system (or apparatus or device). For example, the computer readable storage medium 604 includes a semiconductor or solid-state memory, a magnetic tape, a removable computer diskette, a random access memory (RAM), a read-only memory (ROM), a rigid magnetic disk, or an optical disk. In some embodiments using optical disks, the computer readable storage medium 904 includes a compact disk-read only memory (CD-ROM), a compact disk-read/write (CD-R/W), or a digital video disc (DVD).

In some embodiments, the storage medium 604 stores the computer program code 606 configured to cause computer architecture 600 to perform a portion or all of the operations as described herein. In some embodiments, the storage medium 604 also stores information needed for performing a portion or all of the operations as described herein as well as information generated during performing a portion or all of the operations as described herein, such as a user interface parameter 616.

In some embodiments, the storage medium 604 stores instructions 607 for interfacing with external devices. The instructions 607 enable processor 602 to generate instructions readable by the external devices to effectively implement a portion or all of the operations as described herein.

Computer architecture 600 includes I/O interface 610. I/O interface 610 is coupled to external circuitry. In some embodiments, I/O interface 610 includes a keyboard, keypad, mouse, trackball, trackpad, or cursor direction keys for communicating information and commands to processor 602.

Computer architecture 600 also includes network interface 612 coupled to the processor 602. Network interface 612 allows computer architecture 600 to communicate with network 614, to which one or more other computer systems are connected. Network interface 612 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described herein, and information are exchanged between different computer architecture 600 via network 614.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1)

steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, or processors supplied with computer-readable instructions stored on computer-readable media. In at least some embodiments, dedicated circuitry includes digital or analog hardware circuits and include integrated circuits (IC) or discrete circuits. In at least some embodiments, programmable circuitry includes reconfigurable hardware circuits including logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network or a wireless network. In at least some embodiments, the network includes copper transmission cables, optical transmission fibers, wireless transmission, routers, firewalls, switches, gateway computers or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the subject disclosure.

While embodiments of the subject disclosure have been described, the technical scope of any subject matter claimed is not limited to the above described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

Supplemental Note 1

A system includes a non-transitory computer readable medium configured to store instructions thereon. The system further includes a processor connected to the non-transitory computer readable medium. The processor is configured to execute the instructions for providing a first information element in a protocol, wherein the first information element is usable to configure parameters associated with convergence of packet data. The processor is configured to execute the instructions for providing a second information element within the first information element, wherein the second information element is usable for a first range of logical channels. The processor is configured to execute the instructions for providing a third information element within the first information element, wherein the third information element is usable for a second range of logical channels outside of the first range of logical channels.

Supplemental Note 2

In some embodiments, the processor of Supplemental Note 1 wherein the parameters are for signaling radio bearers.

Supplemental Note 3

In some embodiments, the processor of any of Supplemental Notes 1-2 wherein the parameters are for data radio bearers.

Supplemental Note 4

In some embodiments, the processor of any of Supplemental Notes 1-3 wherein the first range of logical channels comprises a first integer value range including a first set of integer values, and each of the first set of integer values is less than 33.

Supplemental Note 5

In some embodiments, the processor of any of Supplemental Notes 1-4 wherein the second range of logical channels comprises a second integer value range including a second set of integer values, and each of the second set of integer values is greater than 32.

Supplemental Note 6

In some embodiments, the processor of any of Supplemental Notes 1-5 wherein the first range of logical channels comprises a first integer value range including a first set of integer values, and each of the first set of integer values is greater than 32.

Supplemental Note 7

In some embodiments, the processor of any of Supplemental Notes 1-6 is further configured to execute the instructions for determining whether a first logical channel falls outside of the first range, and bypassing, in response to the determining that the first logical channel falls outside of the first range, the second information element.

A method includes providing a first information element in a protocol, wherein the first information element is usable to configure parameters associated with convergence of packet data. The method further includes providing a second information element within the first information element, wherein the second information element is usable for a first range of logical channels. The method further includes providing a third information element within the first information element, wherein the third information element is usable for a second range of logical channels outside of the first range of logical channels.

Supplemental Note 9

The method of Supplemental Note 8 wherein the parameters are for signaling radio bearers.

Supplemental Note 10

The method of any of Supplemental Notes 8-9 wherein the parameters are for data radio bearers.

Supplemental Note 11

The method of any of Supplemental Notes 8-10 wherein the first range of logical channels comprises a first integer value range including a first set of integer values, and each of the first set of integer values is less than 33.

Supplemental Note 12

The method of any of Supplemental Notes 8-11 wherein the second range of logical channels comprises a second integer value range including a second set of integer values, and each of the second set of integer values is greater than 32.

Supplemental Note 13

The method of any of Supplemental Notes 8-12 wherein the first range of logical channels comprises a first integer value range including a first set of integer values, and each of the first set of integer values is greater than 32.

Supplemental Note 14

The method of any of Supplemental Notes 8-13 further comprising determining whether a first logical channel falls outside of the first range, and bypassing, in response to the determining that the first logical channel falls outside of the first range, the second information element.

Supplemental Note 15

A non-transitory computer readable medium configured to store instructions thereon. The instructions are configured to cause a processor to perform operations comprising providing a first information element in a protocol, wherein the first information element is usable to configure parameters associated with convergence of packet data. The instructions are configured to cause a processor to perform operations comprising providing a second information element within the first information element, wherein the second information element is usable for a first range of logical channels. The instructions are configured to cause a processor to perform operations comprising providing a third information element within the first information element, wherein the third information element is usable for a second range of logical channels outside of the first range of logical channels.

Supplemental Note 16

The non-transitory computer readable medium of Supplemental Note 15, wherein the parameters are for signaling radio bearers.

Supplemental Note 17

The non-transitory computer readable medium of any of Supplemental Notes 15-16, wherein the instructions are configured to cause a processor to perform operations comprising:

Supplemental Note 18

The non-transitory computer readable medium of any of Supplemental Notes 15-17, wherein the parameters are for data radio bearers.

Supplemental Note 19

The non-transitory computer readable medium of any of Supplemental Notes 15-18, wherein the first range of logical channels comprises a first integer value range including a first set of integer values, and each of the first set of integer values is less than 33.

Supplemental Note 20

The non-transitory computer readable medium of any of Supplemental Notes 15-19, wherein the instructions are configured to cause a processor to perform operations comprising determining whether a first logical channel falls outside of the first range, and bypassing, in response to the determining that the first logical channel falls outside of the first range, the second information element.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system comprising:

a non-transitory computer readable medium configured to store instructions thereon; and a processor connected to the non-transitory computer readable medium, wherein the processor is configured to execute the instructions for:

providing a first information element in a protocol, wherein the first information element is usable to configure parameters associated with convergence of packet data, wherein the first information element comprises:

a second information element that is usable for a first range of logical channels, wherein the first range is usable in a first communication generation, wherein the first communication generation comprises long term evolution (LTE), and a third information element that is usable for a second range of logical channels, wherein the second range is usable in a second communication generation different from the first communication generation, wherein the second communication generation comprises fifth-generation (5G);

receiving a primary path including a logical channel identifier (LCID);

determining whether the LCID is within the first range or the second range; and selectively applying one of the second information element or the third information element based on a result of the determining.

2. The system of claim 1, wherein the first range of logical channels comprises a first integer value range including a first set of integer values, and each of the first set of integer values is less than 33.

3. The system of claim 2, wherein the second range of logical channels comprises a second integer value range including a second set of integer values, and each of the second set of integer values is greater than 32.

4. The system of claim 1, wherein the first range of logical channels comprises a first integer value range including a first set of integer values, and each of the first set of integer values is greater than 32.

5. The system of claim 1, wherein the processor is further configured to execute the instructions for:

determining whether a first logical channel falls outside of the first range;

bypassing, in response to the determining that the first logical channel falls outside of the first range, the second information element.

6. A method, the method comprising:

providing a first information element in a protocol, wherein the first information element is usable to configure parameters associated with convergence of packet data, wherein the first information element comprises:

a second information element that is usable for a first range of logical channels, wherein the first range is usable in a first communication generation, wherein the first communication generation comprises long term evolution (LTE), and a third information element that is usable for a second range of logical channels, wherein the second range is usable in a second communication generation different from the first communication generation, wherein the second communication generation comprises fifth-generation (5G);

receiving a primary path including a logical channel identifier (LCID);

determining whether the LCID is within the first range or the second range; and selectively applying one of the second information element or the third information element based on a result of the determining.

7. The method of claim 6, wherein the first range of logical channels comprises a first integer value range including a first set of integer values, and each of the first set of integer values is less than 33.

8. The method of claim 7, wherein the second range of logical channels comprises a second integer value range including a second set of integer values, and each of the second set of integer values is greater than 32.

9. The method of claim 6, wherein the first range of logical channels comprises a first integer value range including a first set of integer values, and each of the first set of integer values is greater than 32.

10. The method of claim 6, further comprising:

determining whether a first logical channel falls outside of the first range;

bypassing, in response to the determining that the first logical channel falls outside of the first range, the second information element.

11. A non-transitory computer readable medium configured to store instructions thereon, wherein the instructions are configured to cause a processor to perform operations comprising:

a processor connected to the non-transitory computer readable medium, wherein the processor is configured to execute the instructions for:

providing a first information element in a protocol, wherein the first information element is usable to configure parameters associated with convergence of packet data, wherein the first information element comprises:

a second information element that is usable for a first range of logical channels, wherein the first range is usable in a first communication generation, and the first communication generation comprises long term evolution (LTE), and a third information element that is usable for a second range of logical channels, wherein the second range is usable in a second communication generation different from the first communication generation, and the second communication generation comprises fifth-generation (5G);

receiving a primary path including a logical channel identifier (LCID);

determining whether the LCID is within the first range or the second range; and selectively applying one of the second information element or the third information element based on a result of the determining.

12. The non-transitory computer readable medium of claim 11, wherein the first range of logical channels comprises a first integer value range including a first set of integer values, and each of the first set of integer values is less than 33.

13. The non-transitory computer readable medium of claim 12, wherein the second range of logical channels comprises a second integer value range including a second set of integer values, and each of the second set of integer values is greater than 32.

14. The non-transitory computer readable medium of claim 12, wherein the instructions are configured to cause a processor to perform operations comprising:

determining whether a first logical channel falls outside of the first range;

bypassing, in response to the determining that the first logical channel falls outside of the first range, the second information element.

15. The system of claim 1, wherein the first range of logical channels is associated with an Evolved Node B (eNB) of LTE, and wherein the second range of logical channels is associated with a gNodeB (gNB) of 5G.

16. The system of claim 15, wherein the primary path is received from one of the eNB or the gNB, and wherein the selectively applying comprises applying the second information element when the LCID is within the first range associated with the eNB and applying the third information element when the LCID is within the second range associated with the gNB.

17. The method of claim 6, wherein the first range of logical channels is associated with an Evolved Node B (eNB) of LTE, and wherein the second range of logical channels is associated with a gNodeB (gNB) of 5G.

18. The method of claim 17, wherein the primary path is received from one of the eNB or the gNB, and wherein the selectively applying comprises applying the second information element when the LCID is within the first range associated with the eNB and applying the third information element when the LCID is within the second range associated with the gNB.

19. The non-transitory computer readable medium of claim 11, wherein the first range of logical channels is associated with an Evolved Node B (eNB) of LTE, and wherein the second range of logical channels is associated with a gNodeB (gNB) of 5G.

20. The non-transitory computer readable medium of claim 19, wherein the primary path is received from one of the eNB or the gNB, and wherein the selectively applying comprises applying the second information element when the LCID is within the first range associated with the eNB and applying the third information element when the LCID is within the second range associated with the gNB.

* * * * *